United States Patent
Hanke (10) Patent No.: US 9,058,851 B1
(45) Date of Patent: Jun. 16, 2015

(54) INFORMATION-STORAGE DEVICE INCLUDING AN OXYGEN ABSORBING DEVICE

(71) Applicant: Western Digital Technologies, Inc., Irvine, CA (US)

(72) Inventor: Frederick J. Hanke, Newark, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/322,764

(22) Filed: Jul. 2, 2014

(51) Int. Cl.
*G11B 33/14* (2006.01)
*B01D 53/22* (2006.01)
*B01D 53/26* (2006.01)
*B01D 53/04* (2006.01)

(52) U.S. Cl.
CPC .......... *G11B 33/1486* (2013.01); *B01D 53/229* (2013.01); *B01D 53/261* (2013.01); *B01D 53/0446* (2013.01); *B01D 2053/221* (2013.01)

(58) Field of Classification Search
CPC .... G11B 33/14; G11B 33/1486; G11B 19/20; G11B 19/2036
USPC .......... 360/97.13, 97.12, 97.16, 97.19, 97.17, 360/97.14, 97.22
See application file for complete search history.

(56) References Cited

U.S. PATENT DOCUMENTS

| | | |
|---|---|---|
| 5,235,482 A | 8/1993 | Schmitz |
| 5,536,302 A | 7/1996 | Golden et al. |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |

(Continued)

FOREIGN PATENT DOCUMENTS

| | | |
|---|---|---|
| EP | 2298440 | 7/2009 |
| EP | 2107570 | 10/2009 |
| EP | 2336239 | 1/2013 |

OTHER PUBLICATIONS

Powder Tech, "Preserving & Protecting Your Products from Manufacture to Final Use", OmniKeep & OmniBatch Brochure, Mar. 14, 2014, 2 pages.

*Primary Examiner* — Allen T Cao (57) ABSTRACT

An information-storage device comprises an information-storage medium, a transducer operable to write and to read information on the information-storage medium, and a sealed enclosure enclosing the same in an interior space containing an atmosphere comprising a gas mixture including a substantially inert gas and oxygen gas having a molar concentration between about 0% and about 10%. The sealed enclosure includes a base, a cover, and a seal that joins cover to base. The information-storage device may include at least one oxygen permeable component integrated with the sealed enclosure. The information-storage device further comprises an oxygen absorbing device operable to remove a substantial portion of oxygen gas from the atmosphere within. The oxygen absorbing device includes an oxygen absorbent material comprising oxygen-deficient cerium oxide, $CeO_{2-x}$, where $0<x<0.5$, and a membrane permeable to transport of oxygen, that prevents particles escaping therefrom. The information-storage device may be a hard-disk drive.

23 Claims, 3 Drawing Sheets

(56) References Cited

U.S. PATENT DOCUMENTS

| | | |
|---|---|---|
| 6,185,074 B1 | 2/2001 | Wang et al. |
| 6,208,486 B1 | 3/2001 | Gustafson et al. |
| 6,215,616 B1 | 4/2001 | Phan et al. |
| 6,272,694 B1 | 8/2001 | Knoth |
| 6,288,866 B1 | 9/2001 | Butler et al. |
| 6,292,333 B1 | 9/2001 | Blumentritt et al. |
| 6,317,286 B1 | 11/2001 | Murphy et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,582,279 B1 | 6/2003 | Fox et al. |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,842,306 B2 | 1/2005 | Cyrille et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,049,359 B2 | 5/2006 | Cochran et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,116,532 B2 | 10/2006 | Carey et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |

(56) References Cited

U.S. PATENT DOCUMENTS

| | | |
|---|---|---|
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,440,281 B2 | 10/2008 | Bailey et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,811,539 B2 | 10/2010 | Deeken et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,328,915 B2 | 12/2012 | Senoo et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,435,336 B2 | 5/2013 | Kinoshita et al. |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |

(56) References Cited

U.S. PATENT DOCUMENTS

| | | |
|---|---|---|
| 8,797,689 B1 | 8/2014 | Pan et al. |
| 8,824,095 B1 | 9/2014 | Dougherty |
| 8,824,098 B1 | 9/2014 | Huang et al. |
| 2002/0131200 A1 | 9/2002 | Tomioka |
| 2005/0270679 A1 | 12/2005 | Victor et al. |
| 2007/0236829 A1 | 10/2007 | Brown et al. |
| 2009/0126573 A1 | 5/2009 | Kinoshita |
| 2009/0244769 A1 | 10/2009 | Dai et al. |
| 2009/0246556 A1 | 10/2009 | Senoo et al. |
| 2010/0091414 A1* | 4/2010 | Yuasa et al. .................. 360/324 |
| 2011/0086757 A1 | 4/2011 | Kinoshita et al. |
| 2011/0141618 A1 | 6/2011 | Wallash et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |
| 2013/0310252 A1 | 11/2013 | Sakamoto et al. |

\* cited by examiner

INFORMATION-STORAGE DEVICE INCLUDING AN OXYGEN ABSORBING DEVICE

BACKGROUND OF THE INVENTION

Information-storage devices are essential to the functioning of modern society. Amongst the many types of information-storage devices, hard-disk drives (HDDs) occupy a prominent position, if not the dominant position, for the storage of information in the form of digital data, ranging from the storage of data in data bases for governmental and financial institutions, to consumer applications such as desktop computers and set-top boxes for digital video. An essential performance metric of digital information storage in HDDs is areal density (AD), which is a measure of the amount of information that can be stored in a unit of area of the information-storage medium used to store information in the information-storage device, for example, an HDD. Therefore, scientists and engineers engaged in the research and development of information-storage technology, and particularly HDD technology, are keenly interested in advancing the amount of information that can be stored in information-storage devices through increasing the AD of such devices, particularly HDDs.

DESCRIPTION OF EMBODIMENTS

Figure 1:
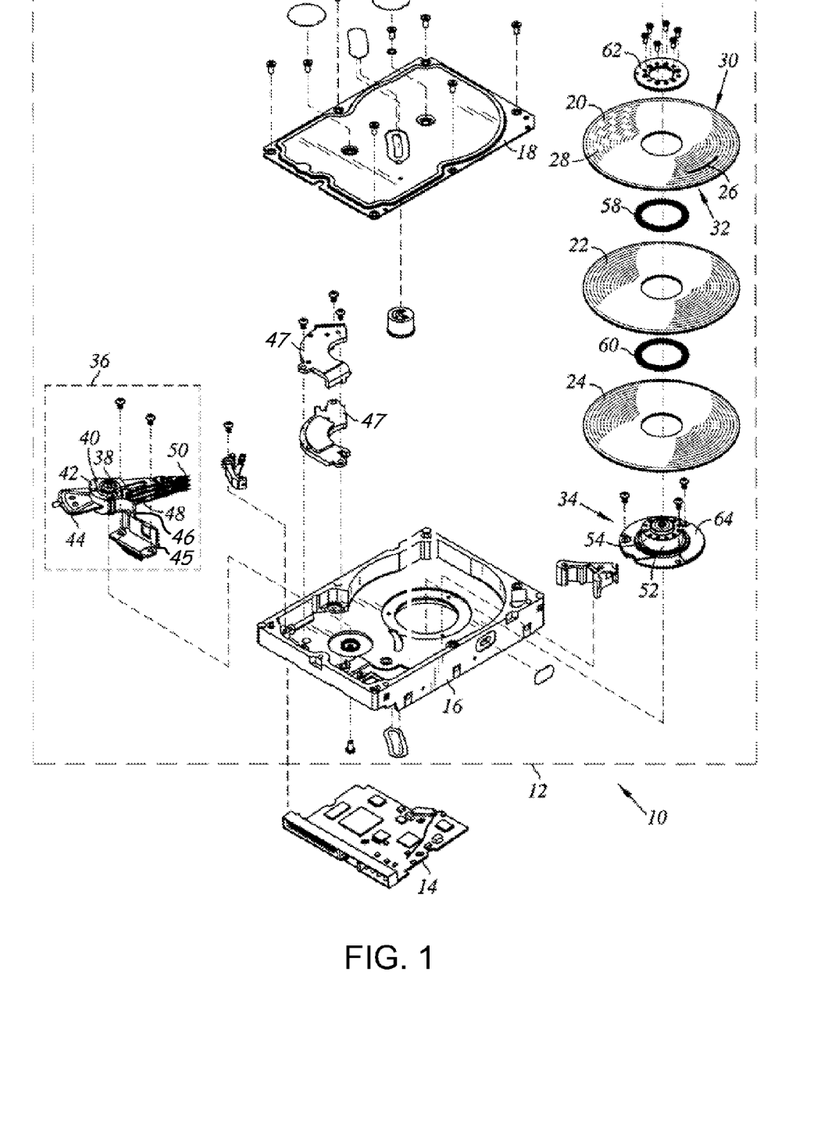
FIG. 1 is an exploded perspective view of a disk drive, in accordance with embodiments described herein.

Referring now to FIG. 1, in accordance with an embodiment, an exploded perspective view of an information-storage device, by way of example, a hard-disk drive (HDD) 10, is shown. In the embodiment shown, HDD 10 includes a head-disk assembly (HDA) 12, and a printed-circuit-board assembly (PCBA) 14. The HDA 12 includes an enclosure that includes a base 16, a cover 18, and a seal (not visible in FIG. 1) that joins the cover 18 to the base 16. When joined together, the base 16, the cover 18, and the seal together may create a portion, or an entirety, of a sealed enclosure enclosing the information-storage medium, by way of example, magnetic-recording disks 20, 22, 24, and a transducer, by way of example, a magnetic-recording head, in an interior space of the sealed enclosure. In accordance with embodiments, the sealed enclosure contains an atmosphere comprising a gas mixture including a substantially inert gas and oxygen gas having a molar concentration between about 0% and about 10%. As used herein, a sealed enclosure will be understood to include an enclosure selected from the group consisting of a hermetically sealed enclosure and an enclosure permeable to the transport of gas through components comprising the enclosure that create an envelope for containing the gaseous atmosphere therein; however, excluded from this group are enclosures that allow the free passage of air from outside of an enclosure to the interior of the enclosure, for example, enclosures that include breather ports. In accordance with an embodiment, the substantially inert gas may be selected from the group consisting of hydrogen ($H_2$), and the inert gases, helium (He) and nitrogen ($N_2$). As described herein, hydrogen gas ($H_2$) has been included in the group of substantially inert gases, because of its ability to inhibit oxidation reactions, in particular, the oxidation of metals, due to its reducing ability. Use of these gases to fill the interior space of HDD 10 facilitates a lower fly-height of the magnetic-recording head that enables increased areal density (AD) of recorded information, particularly, when the pressure within the enclosure is reduced below atmospheric pressure.

Figure 3:
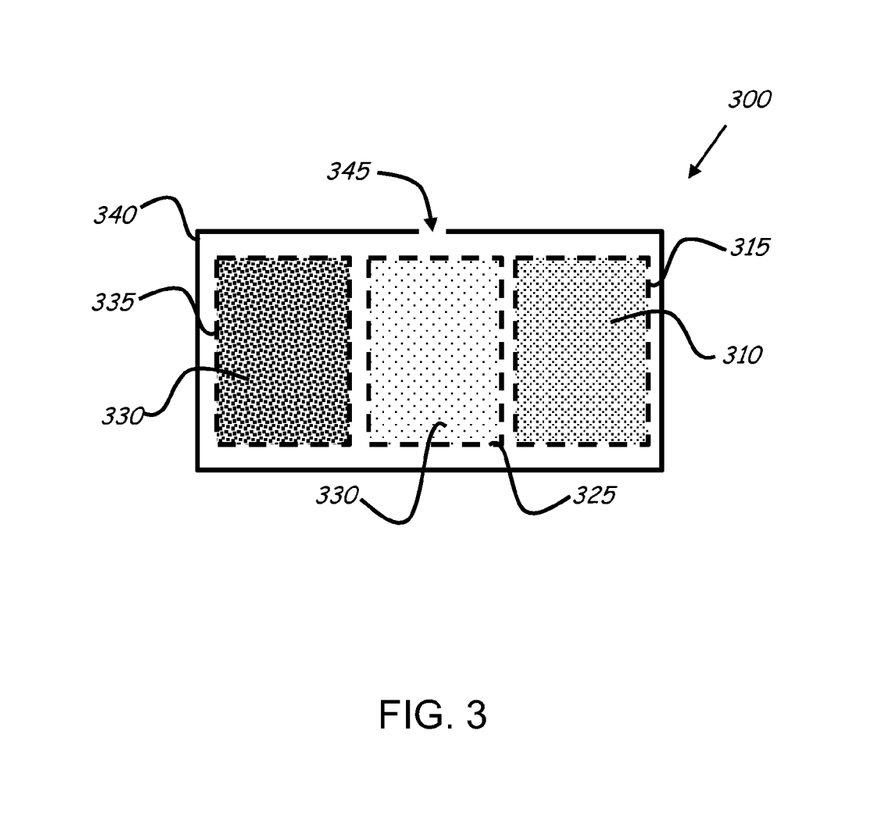
FIG. 3 is a schematic diagram of the oxygen absorbing device, in accordance with embodiments described herein.

In accordance with an embodiment, without limitation thereto, the seal may be permeable to transport of oxygen from outside of the sealed enclosure to the interior space of the sealed enclosure containing the gaseous atmosphere. In accordance with another embodiment, without limitation thereto, at least one oxygen permeable component may be integrated with the sealed enclosure and form at least another portion of an envelope operable to contain the gaseous atmosphere. With reference also to FIG. 3, in accordance with embodiments, the information-storage device, by way of example, HDD 10, includes an oxygen absorbing device 300 operable to remove a substantial portion of oxygen gas from the gaseous atmosphere, which substantially reduces the cost of fabrication of HDD 10 by enabling the use of such oxygen permeable components forming the enclosure. As used herein, the phrases, "remove a substantial portion of oxygen gas," "substantially remove oxygen," and semantically equivalent phrases are defined as removing oxygen gas by reducing the molar concentration of oxygen gas in the atmosphere within the enclosure to below about 1% molar concentration. Also, as used herein, the phrase, "substantially oxygen-free," is defined as having a molar concentration of oxygen gas in the atmosphere within the enclosure below about 1% molar concentration. Therefore, use of the oxygen absorbing device 300, in accordance with embodiments further subsequently described herein, obviates the use of more costly alternatives for fabrication of HDDs to maintain a substantially oxygen-free state of such atmospheres, for example, laser welding of the enclosure, or use of glass-to-metal seals in electrical feedthroughs. Thus, embodiments are expected to enjoy commercial success due to the elimination of a costly laser-welded enclosure and an electrical feedthrough incorporating glass-to-metal seals for a helium-filled HDD, which are expected to reduce the cost of manufacturing the helium-filled HDD by about $50 or more per HDD.

With further reference to FIG. 1, each magnetic-recording disk 20, 22, 24 contains a plurality of tracks for storing information in the form of digital data. The magnetic-recording disks 20, 22, 24 may be two-sided; and thus, for example, the magnetic-recording disk 20 is shown having a track 26 on an upper facing side 30 and a track 28 (shown in phantom) on a lower facing side 32. The HDA 12 further includes a spindle motor 34 for rotating the magnetic-recording disks 20, 22, 24. The HDA 12 further includes a head-stack assembly (HSA) 36 and a pivot bearing cartridge 38. The HSA 36 includes a rotary actuator 40.

The rotary actuator 40 includes an actuator body 42 that has a bore and the pivot bearing cartridge 38 is engaged within the bore for facilitating the rotary actuator 40 to rotate between limited positions. The rotary actuator 40 further includes a coil portion 44 that extends from one side of the actuator body 42 to interact with a pair of permanent magnets 47 to form a voice coil motor for pivoting the rotary actuator 40. A flexible cable 46, also referred to by the term of art, "flex," provides electrical power to the actuator for its motion. A plurality of actuator arms, the lowermost one of which being denoted 48, extends from an opposite side of the actuator body 42. As the disks 20, 22, 24 may be two sided, each of the actuator arms including either one or two head gimbal assemblies (HGAs) associated with the adjacent sides of the disks 20, 22, 24. Each head-gimbal assembly (HGA) includes an air bearing slider or slider (the uppermost one being denoted 50). Each air bearing slider 50 includes the transducer, by way of example, a magnetic-recording head, that is operable to write information in, and operable to read information from, the information-storage medium, by way of example, the magnetic-recording disk 20. The flexible cable 46 also provides communication of electrical signals to and from the magnetic-recording heads of HSA 36. The flexible cable 46 is connected to an electrical feedthrough 45 that provides for electrical signal communication between the HSA 36 in the interior of HDA 12 and PCBA 14 on the exterior of HDA 12.

The spindle motor 34 includes a spindle motor hub 52 that is rotatably attached to the base 16. The spindle motor hub 52 has a hub body 54 and a hub flange that extends from the hub body 54, as shown in FIG. 1. The hub flange includes a supporting surface for supporting a lowermost one of the magnetic-recording disks, namely magnetic-recording disk 24. The remaining magnetic-recording disks 22, 20 are stacked and separated with annular disk spacers 58, 60 that are disposed about the hub body 54. A disk clamp 62 is attached about the spindle motor hub 52 and is utilized to apply a clamping force against the topmost magnetic-recording disk 20 for securing all the magnetic-recording disks 20, 22, 24 to the spindle motor hub 52. The spindle motor 34 may further include a spindle motor base 64 that is mounted to the base 16.

With reference also to FIG. 3, and the embodiment shown in FIG. 1, the information-storage device, by way of example, HDD 10, includes the oxygen absorbing device 300 operable to remove a substantial portion of oxygen gas ($O_2$) from the internal atmosphere of the information-storage device, by way of example, HDD 10. In accordance with embodiments, removal of oxygen gas ($O_2$) from the interior space of HDD 10 is useful for maintaining an oxygen permeable enclosure with an atmosphere including a substantially oxygen-free, substantially inert gas at reduced pressure for lower fly heights that facilitate recording at higher AD, by way of example without limitation thereto, a helium-filled HDD wherein the internal pressure is about 0.8 atmospheres (atm). Alternatively, in accordance with an embodiment, a helium-filled HDD may be enclosed in a hermetically sealed enclosure. In accordance with embodiments, removal of oxygen gas ($O_2$) from the interior space of HDD 10 is also useful for maintaining a substantially oxygen-free atmosphere within the interior space of the HDD 10 to inhibit oxidation of volatile organic compounds (VOCs), as well as other oxidizable materials and structures within HDD 10, by way of example without limitation thereto, components of a heat-assisted magnetic recording (HAMR) HDD that are subjected to high temperatures. In accordance with embodiments, the oxygen absorbing device 300 includes an oxygen absorbent material 310 comprising the material, oxygen-deficient cerium oxide, $CeO_{2-x}$, where $0<x<0.5$. Thus, embodiments wherein the oxygen absorbing device 300 includes an oxygen absorbent material 310 comprising the material, oxygen-deficient cerium oxide, $CeO_{2-x}$, where $0<x<0.5$, are expected to provide an oxygen absorbent material 310 in HDD 10 that satisfies the restriction on the use of certain hazardous substances (ROHS). As used herein, in accordance with embodiments, the term of art, "oxygen-deficient cerium oxide," is defined as a substoichiometric cerium oxide wherein the oxygen deficiency specified by x may lie in a range greater than 0 and less than 1, unless the oxygen deficiency specified by x is specifically indicated to lie within a narrower range therein, by way of example without limitation thereto, $0<x<0.5$, or at a specific value therein, by way of example without limitation thereto, $x=0.3$. In one embodiment, the oxygen absorbing device 300 may be configured as a filter to filter airflow within HDD 10 that may be induced by the motion of the magnetic-recording disks 20, 22, 24. Alternatively, the oxygen absorbing device 300 may be configured as a passive device not intercepting the airflow directly, but relying on the diffusional transport of oxygen gas in the internal atmosphere of HDD 10 to the oxygen absorbing device 300, where the oxygen is substantially removed from the internal atmosphere of the information-storage device, by way of example, HDD 10.

Figure 2:
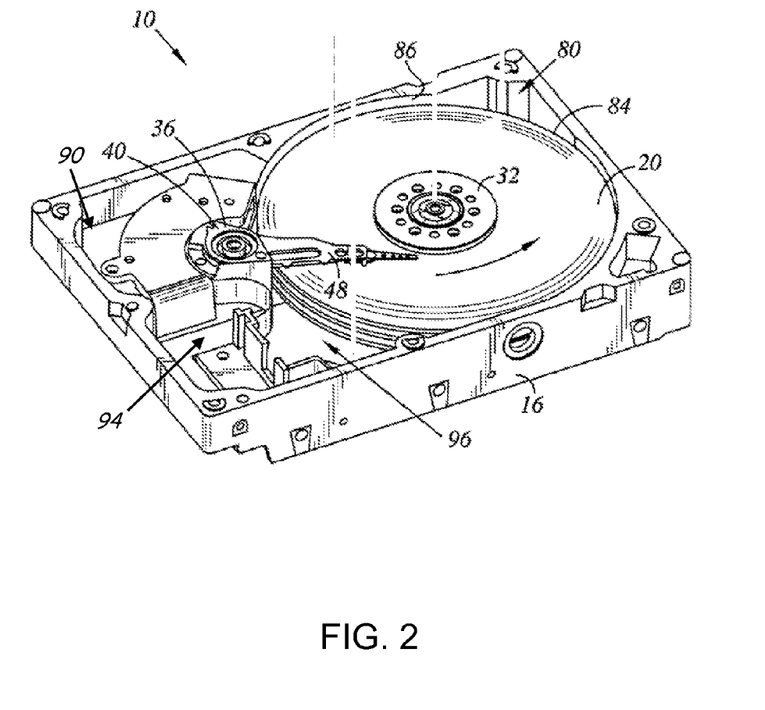
FIG. 2 is an enlarged perspective view of the disk drive (without a cover) of FIG. 1 that shows some locations where an oxygen absorbing device can be disposed therein, in accordance with embodiments described herein.

With reference now to FIG. 2, in accordance with an embodiment, an enlarged perspective view of HDD 10 (without the cover 18) of FIG. 1 is shown. The HDD 10 includes the base 16. The HDD 10 further includes the magnetic-recording disk, such as magnetic-recording disk 20, rotatably coupled to the base 16. The HDD 10 further includes the spindle motor 34 attached to the base 16 and configured to support the magnetic-recording disk 20 for rotating the magnetic-recording disk 20 with respect to the base 16. The base shroud surface 86 formed in the base 16 is also shown. The HDD 10 further includes the oxygen absorbing device 300 as shown in FIG. 3. As shown in FIG. 2, the base 16 may be formed to include one or more cavities 80, 90, 94, 96. An oxygen absorbing device 300 may be disposed within cavity 80, cavity 90, cavity 94, and/or cavity 96. The oxygen absorbing device 300 may be attached to the base 16.

With reference now to FIG. 3, in accordance with an embodiment, a schematic diagram of the oxygen absorbing device 300 is shown. The oxygen absorbing device 300 includes an oxygen absorbent material 310, and a permeable membrane 315 operable both to permit transport of oxygen therethrough, and to preclude escape of particles from an interior of the oxygen absorbing device 300. The oxygen absorbing device 300 is operable to remove a substantial portion of oxygen gas from the atmosphere comprising a gas mixture including a substantially inert gas and oxygen gas having a molar concentration between about 0% and about 10% enveloped within the sealed enclosure of the information-storage device, by way of example HDD 10, without releasing particles within the sealed enclosure that are capable of interfering with recording of information in, and reading of information from, an information-storage medium, by way of example, magnetic-recording disks 20, 22, 24, that are enclosed within the sealed enclosure.

In accordance with another embodiment, the oxygen absorbing device 300 may further include a desiccant material 320, and a permeable membrane 325 operable both to permit transport of water vapor therethrough for the capture thereof by desiccant material 320, and to preclude escape of particles from the interior of the oxygen absorbing device 300. In accordance with embodiments, the desiccant material 320 comprises a material selected from the group consisting of silica gel and alumina. Similarly, in accordance with yet another embodiment, the oxygen absorbing device 300 may further include an organic compound absorbent material 330, and a permeable membrane 335 operable both to permit transport of volatile organic compounds (VOCs) therethrough for the capture thereof by organic compound absorbent material 330, and to preclude escape of particles from the interior of the oxygen absorbing device 300. In accordance with embodiments, the organic compound absorbent material 330 comprises a material selected from the group consisting of activated charcoal, potassium carbonate ($K_2CO_3$) and sodium carbonate ($Na_2CO_3$).

In accordance with embodiments, one or more of the permeable membranes 315, 325, 335, comprise materials selected from the group consisting of expanded polytetrafluoroethylene (ePTFE) and polyester. ePTFE is sometimes referred to by the trade name GORE-TEX™. In accordance with embodiments, one or more of the permeable membranes 315, 325, 335, may be configured as bags within which the respective oxygen absorbent material 310, desiccant material 320, and organic compound absorbent material 330 are disposed. In accordance with embodiments, although one or more of the permeable membranes 315, 325, 335, are shown separately in FIG. 3, the respective oxygen absorbent material 310, desiccant material 320, and organic compound absorbent material 330 may be intermixed together and disposed in one or more bags in various amounts. For example, in accordance with an embodiment, the desiccant material 320 may be sprinkled in with the oxygen absorbent material 310 enclosed by a single permeable membrane in the form of a bag.

With further reference to FIG. 3, in accordance with an embodiment, the oxygen absorbing device 300 may include a container 340, without limitation thereto, wherein the oxygen absorbent material 310 is disposed. Similarly, a desiccant material 320 and an organic compound absorbent material 330 may be disposed in the container 340 along with the oxygen absorbent material 310. In accordance with an embodiment, without limitation thereto, the container 340 may include a canister with an orifice 345 for communication of the interior of the container 340 with the atmosphere in the interior space of the enclosure of the information-storage device, by way of example HDD 10. Alternatively, in accordance with an embodiment, the container 340 may include a permeable membrane comprising materials selected from the group consisting of expanded polytetrafluoroethylene (ePTFE) and polyester. Alternatively, in accordance with an embodiment, without limitation thereto, the container 340 may include a canister with a second orifice (not shown) for communication of the interior of the container 340 with the gas-flow of the atmosphere in the interior space of the enclosure of the information-storage device, by way of example HDD 10. Therefore, in accordance with an embodiment, without limitation thereto, the container 340 may be configured as a filter body. Moreover, in accordance with embodiments, the container 340 may be configured as a bag within which the respective oxygen absorbent material 310, desiccant material 320, and organic compound absorbent material 330 are disposed.

With further reference to FIG. 3, in accordance with an embodiment, the oxygen absorbent material 310 of the oxygen absorbing device 300 comprises oxygen-deficient cerium oxide, $CeO_{2-x}$, where $0<x<0.5$. In accordance with an embodiment, the oxygen-deficient cerium oxide, $CeO_{2-x}$, has essentially a fluorite crystallographic structure. In accordance with an embodiment, the oxygen-deficient cerium oxide, $CeO_{2-x}$, has oxygen vacancies on oxygen sites in its crystallographic structure, which are operable to absorb oxygen and rapidly transport oxygen to the interior of the crystal structure. In accordance with another embodiment, the oxygen absorbent material comprising oxygen-deficient cerium oxide, $CeO_{2-x}$, includes a plurality of micropores, which are operable to adsorb or absorb oxygen therein. In accordance with another embodiment, the oxygen absorbent material comprising oxygen-deficient cerium oxide, $CeO_{2-x}$, includes a porous, oxygen deficient structure, of fine grain size having sufficient surface area to adsorb oxygen that may permeate the seal or other oxygen permeable components of HDD 10 over the expected lifetime of HDD 10. A suitable form of the oxygen absorbent material comprising oxygen-deficient cerium oxide, $CeO_{2-x}$, is sold under the trademark OMNI-KEEP™, or as described in EP2298440A1. In accordance with an embodiment, the amount of oxygen absorbent material comprising oxygen-deficient cerium oxide, $CeO_{2-x}$, is sufficient to remove a substantial portion of oxygen that may permeate the seal or other oxygen permeable components of HDD 10 over the expected lifetime of HDD 10. In accordance with an embodiment, the amount of oxygen absorbent material 310 comprising oxygen-deficient cerium oxide, $CeO_{2-x}$, is between about 0.1 gram (gm) to about 2.0 gm. Moreover, in accordance with some embodiments, the amount and the structure of oxygen-deficient cerium oxide, $CeO_{2-x}$, are sufficient to provide enough oxygen gas-absorbing capacity to act, not just as a mere scavenger of trace amounts of oxygen gas, but also as a true absorber of substantial amounts of oxygen gas, for example, as might be present in an HDD having a volume of the interior space on the order of about 5 cubic cm (cc), or less, initially sealed with about 21% molar concentration of oxygen gas at 1 atm pressure, to reduce the molar concentration of oxygen gas to less than about 1% molar concentration after sealing the enclosure with the oxygen absorbent material 310 comprising oxygen-deficient cerium oxide, $CeO_{2-x}$, therein.

In accordance with an embodiment, lesser amounts of the oxygen absorbent material 310 comprising oxygen-deficient cerium oxide, $CeO_{2-x}$, on the order of tenths of a gram, may be suitable for embodiments including helium-filled HDDs. Therefore, in accordance with an embodiment, the amount of the oxygen absorbent material 310 comprising oxygen-deficient cerium oxide, $CeO_{2-x}$, within the helium-filled HDD is sufficient to maintain a vacuum against the transport of oxygen through oxygen permeable components into the interior space of the enclosure. On the other hand, in accordance with another embodiment, larger amounts of the oxygen absorbent material 310 comprising oxygen-deficient cerium oxide, $CeO_{2-x}$, on the order of about a gram, may be suitable for embodiments including HDDs, by way of example without limitation thereto, heat-assisted magnetic recording (HAMR) HDDs, that include a nitrogen gas atmosphere, the amount of the oxygen absorbent material 310 comprising oxygen-deficient cerium oxide, $CeO_{2-x}$, being sufficient to remove substantially all the oxygen gas from an HDD initially filled with air at atmospheric pressure and then sealed. Therefore, in accordance with an embodiment, an amount of the oxygen absorbent material 310 comprising oxygen-deficient cerium oxide, $CeO_{2-x}$, which is sufficient to remove substantially all the oxygen gas from an HDD initially filled with air at atmospheric pressure and then sealed, is sufficient to produce a low level vacuum in HDD 10, on the order of 0.8 atmospheres (atm) pressure, and maintain that pressure against oxygen transport through the seal and/or other oxygen permeable component integrated with the sealed enclosure, for example, the electrical feedthrough 35, during the life of HDD 10, which, depending on the HDD product type, may be anywhere from about two years to about seven years. In accordance with an embodiment for a typical HDD product type, the amount of oxygen absorbent material 310 comprising oxygen-deficient cerium oxide, $CeO_{2-x}$, may be on the order of about a quarter of a gram.

With further reference to FIGS. 1 and 2, in accordance with embodiments, the seal is less than 1 milli-inch (mil) to 4 mils thick and is less than 2 centimeters (cm) wide. As used herein, the thickness of the seal is defined as the nominal distance spanned by the seal between the base 16 and the cover 18; and, the width of the seal is defined as the nominal distance spanned between the inner circumference and outer circumference of the seal about perpendicular to the direction in which the thickness of the seal is measured between the base 16 and the cover 18. In accordance with an embodiment, the seal includes a flexible in-place gasket (FIPG). In accordance with an embodiment, the material comprising the FIPG may comprise a molded compliant polymer, for example, selected from the group consisting of urethane acrylate, ethylene propylene diene monomer (EPDM) rubber and fluoroelastomer (FKM), without limitation thereto. Alternatively, in accordance with an embodiment, the seal includes pressure sensitive adhesive (PSA) tape that may be heat-sealable, without limitation thereto. In accordance with an embodiment, the oxygen permeable component includes the electrical feedthrough 45. Alternatively, in accordance with embodiments, the oxygen permeable component may be at least one or more selected from the group consisting of: a space between a periphery of a motor-bearing bore and the motor bearing, and/or the motor bearing or other material components or sealants disposed in the motor-bearing bore; a plugged fill port; and one or more access ports for testing HDD 10 and aligning components within HDD 10. Furthermore, in accordance with embodiments, although FIGS. 1 and 2 show numerous other ports and apertures in HDA 12, the oxygen permeable component may comprise PSA tape, tapes, and/or another suitable seal, seals, that cover one or more of these other ports and apertures.

Although embodiments have been described herein with respect to specific embodiments described above, this has been by way of example as other embodiments are also within the spirit and scope of this description. For example, although embodiments within the environment of information-storage devices have been described for HDDs, this has been by way of example without limitation thereto, as other information-storage devices, for example, magneto-optical disk drives, are also within the spirit and scope of those embodiments described herein. Therefore, the scope of embodiments described herein is to be construed in light of the CLAIMS.

What is claimed is:
1. An information-storage device, comprising:
an information-storage medium;
a transducer operable to write information in, and operable to read information from, said information-storage medium;
a sealed enclosure enclosing said information-storage medium and said transducer in an interior space of said enclosure containing an atmosphere comprising a gas mixture including a substantially inert gas and oxygen gas having a molar concentration between about 0% and about 10%, said enclosure including:
a base;
a cover; and,
a seal that joins said cover to said base; and,
an oxygen absorbing device operable to remove a substantial portion of said oxygen gas from said atmosphere, including an oxygen absorbent material comprising oxygen-deficient cerium oxide, $CeO_{2-x}$, where $0<x<0.5$.
2. The information-storage device of claim 1, wherein said seal is permeable to transport of oxygen from outside of said sealed enclosure to said interior space of said sealed enclosure containing said atmosphere.
3. The information-storage device of claim 2, wherein said seal is less than 1 mil to 4 mils thick.
4. The information-storage device of claim 2, wherein said seal is less than 2 cm wide.

5. The information-storage device of claim 1, wherein the amount of oxygen absorbent material comprising oxygen-deficient cerium oxide, $CeO_{2-x}$, is between about 0.1 gm to about 2.0 gm.
6. The information-storage device of claim 1, wherein said oxygen-deficient cerium oxide, $CeO_{2-x}$, has essentially a fluorite crystallographic structure.
7. The information-storage device of claim 1, wherein said oxygen-deficient cerium oxide, $CeO_{2-x}$, has oxygen vacancies on oxygen sites in its crystallographic structure.
8. The information-storage device of claim 1, wherein said oxygen absorbent material comprising oxygen-deficient cerium oxide, $CeO_{2-x}$, includes a plurality of micropores.
9. A hard-disk drive, comprising:
a magnetic-recording disk;
a magnetic-recording head operable to write information in, and operable to read information from, said magnetic-recording disk;
a sealed enclosure enclosing said magnetic-recording disk and said magnetic-recording head within an interior space of said sealed enclosure forming a first portion of an envelope operable to contain an atmosphere comprising a gas mixture including a substantially inert gas and oxygen gas having a molar concentration between about 0% and about 10%, said sealed enclosure including:
a base;
a cover; and,
a seal that joins said cover to said base;
at least one oxygen permeable component integrated with said sealed enclosure and forming at least another portion of said envelope operable to contain said atmosphere; and,
an oxygen absorbing device operable to remove a substantial portion of said oxygen gas from said atmosphere, including an oxygen absorbent material comprising oxygen-deficient cerium oxide, $CeO_{2-x}$, where $0<x<0.5$.
10. The hard-disk drive of claim 9, wherein said seal is permeable to transport of oxygen from outside of said sealed enclosure to said interior space of said sealed enclosure containing said atmosphere.
11. The hard-disk drive of claim 10, wherein said seal comprises a flexible in-place gasket (FIPG).
12. The hard-disk drive of claim 9, wherein the amount of oxygen absorbent material comprising oxygen-deficient cerium oxide, $CeO_{2-x}$, is between about 0.1 gm to about 2.0 gm.
13. The hard-disk drive of claim 9, wherein said oxygen absorbent material comprising oxygen-deficient cerium oxide, $CeO_{2-x}$, includes a plurality of micropores.
14. The hard-disk drive of claim 9, wherein said oxygen permeable component comprises an electrical feedthrough.
15. The hard-disk drive of claim 9, wherein said substantially inert gas comprises a gas selected from the group consisting of hydrogen gas, helium gas and nitrogen gas.
16. The hard-disk drive of claim 9, wherein said oxygen absorbing device further includes a desiccant material.
17. The hard-disk drive of claim 9, wherein said oxygen absorbing device further includes an organic compound absorbent material.
18. The hard-disk drive of claim 9, wherein said oxygen absorbing device further includes a permeable membrane operable both to permit transport of oxygen therethrough, and to preclude escape of particles from an interior of said container.
19. An oxygen absorbing device for a hard-disk drive, comprising:

an oxygen absorbent material, comprising oxygen-deficient cerium oxide, $CeO_{2-x}$, where $0<x<0.5$; and a permeable membrane operable both to permit transport of oxygen therethrough, and to preclude escape of particles from an interior of said oxygen absorbing device;

wherein said oxygen absorbing device is operable to remove a substantial portion of oxygen gas from an atmosphere comprising a gas mixture including a substantially inert gas and oxygen gas having a molar concentration between about 0% and about 10% enveloped within a sealed enclosure of said hard-disk drive without releasing particles within said sealed enclosure that are capable of interfering with recording of information in, and reading of information from, an information-storage medium enclosed within said sealed enclosure.

20. The oxygen absorbing device of claim 19, further including a desiccant material.

21. The oxygen absorbing device of claim 19, further including an organic compound absorbent material.

22. The oxygen absorbing device of claim 19, wherein the amount of oxygen absorbent material comprising oxygen-deficient cerium oxide, $CeO_{2-x}$, is between about 0.1 gm to about 2.0 gm.

23. The oxygen absorbing device of claim 19, wherein said oxygen absorbent material comprising oxygen-deficient cerium oxide, $CeO_{2-x}$, includes a plurality of micropores.

* * * * *